United States Patent
Matsumoto et al.

(10) Patent No.: US 6,539,342 B2
(45) Date of Patent: Mar. 25, 2003

(54) SORTING OBJECTS BASED ON PHYSICAL CHARACTERISTICS

(75) Inventors: Yuji Matsumoto, Kamakura (JP); Satoshi Watanabe, Kawasaki (JP); Hiroshi Fukuta, Yokohama (JP); Masato Suda, Kawasaki (JP); Yoshikazu Tagami, Tokyo (JP); Kei Takizawa, Kawasaki (JP); Shinya Watanabe, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 192 days.

(21) Appl. No.: 09/727,385

(22) Filed: Dec. 1, 2000

(65) Prior Publication Data

US 2001/0012987 A1 Aug. 9, 2001

(30) Foreign Application Priority Data

Dec. 3, 1999 (JP) .......................... 11-345297

(51) Int. Cl.⁷ .............................. G06F 15/00
(52) U.S. Cl. .................. 702/189; 702/81; 702/188; 702/189; 356/27; 356/28; 356/319; 340/3.3; 340/3.31; 250/316.1; 250/317.1
(58) Field of Search ................ 702/34–36, 40, 702/27, 81–84, 155–159, 166, 170, 172–175, 183, 188, 189; 382/101, 105, 108, 109, 112, 115, 128, 131, 132, 135–137, 140–141, 154, 181, 195, 199, 312, 321; 356/27–28, 28.5, 43, 51, 53, 300, 302, 319, 450, 451, 388, 390, 3.401, 4.03, 600, 954; 340/500, 545.2, 545.3, 825, 3.3, 3.31, 3.42, 988, FOR 210, FOR 212, FOR 215; 250/316.1, 317.1, 318, 580–5, 82, 584, 330, 333, 200, 201.1, 201.2, 336

(56) References Cited

U.S. PATENT DOCUMENTS

| 5,043,663 | A | * | 8/1991 | Lam ........................... 324/242 |
| 5,077,805 | A | | 12/1991 | Tan |
| 5,522,491 | A | | 6/1996 | Baudat et al. |
| 5,538,138 | A | | 7/1996 | Reich |
| 5,856,663 | A | * | 1/1999 | Suzuki et al. ............... 250/201 |
| 6,411,918 | B1 | * | 6/2002 | Ide et al. ..................... 702/150 |
| 6,418,238 | B1 | * | 7/2002 | Shiratani et al. ............ 382/133 |

FOREIGN PATENT DOCUMENTS

EP 0589118 A1 9/1992

* cited by examiner

Primary Examiner—Marc S. Hoff
Assistant Examiner—Elias Desta
(74) Attorney, Agent, or Firm—Pillsbury Winthrop LLP

(57) ABSTRACT

In this invention, the detection result indicating physical characteristics obtained from sensor sections and associated with a to-be-detected object for which it is determined that determination of detection thereof by a high-speed detecting process is difficult to make is stored in a data storage unit. Then, in a precise examination processing section, the detecting process is effected on the non-real time basis for a to-be-detected object for which it is determined that the precise examination is necessary by the high-speed detecting process by use of data stored in the data storage unit and the to-be-detected object is distributed into a storage box corresponding to a category of the to-be-detected object as the detection result from the precise examination processing section.

10 Claims, 12 Drawing Sheets

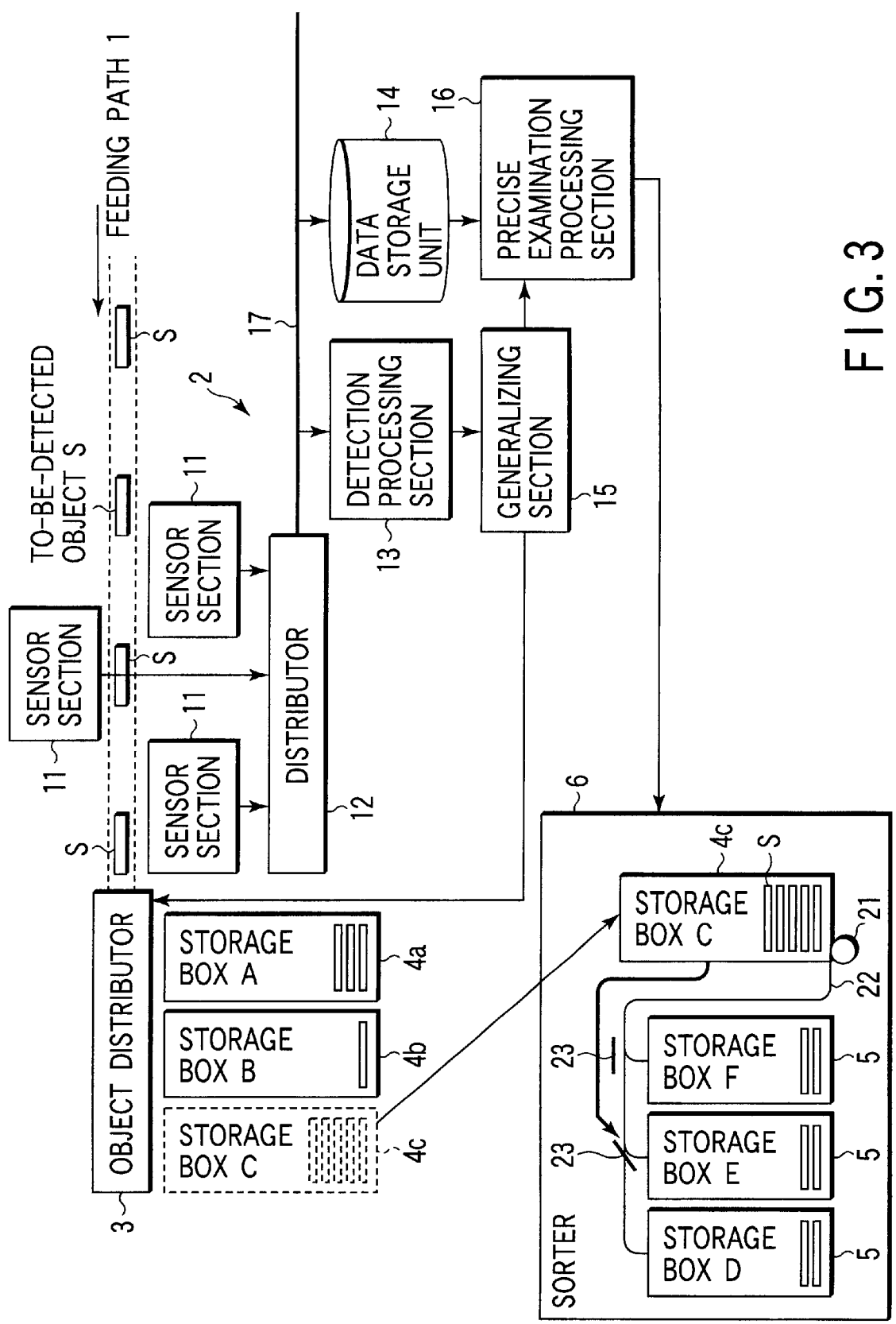
F I G. 3

| THE NUMBER OF INDEX INFORMATION ITEMS | INDEX INFORMATION | INDEX INFORMATION | ......... | INDEX INFORMATION |
|---|---|---|---|---|

| INDEX | DETECTION RESULT |
|---|---|
| 1 | E |
| 2 | D |
| 3 | F |
| 4 | F |
| 5 | D |
| 6 | E |
| 7 | F |
| 8 | D |
| 9 | F |
| ⋮ | ⋮ |

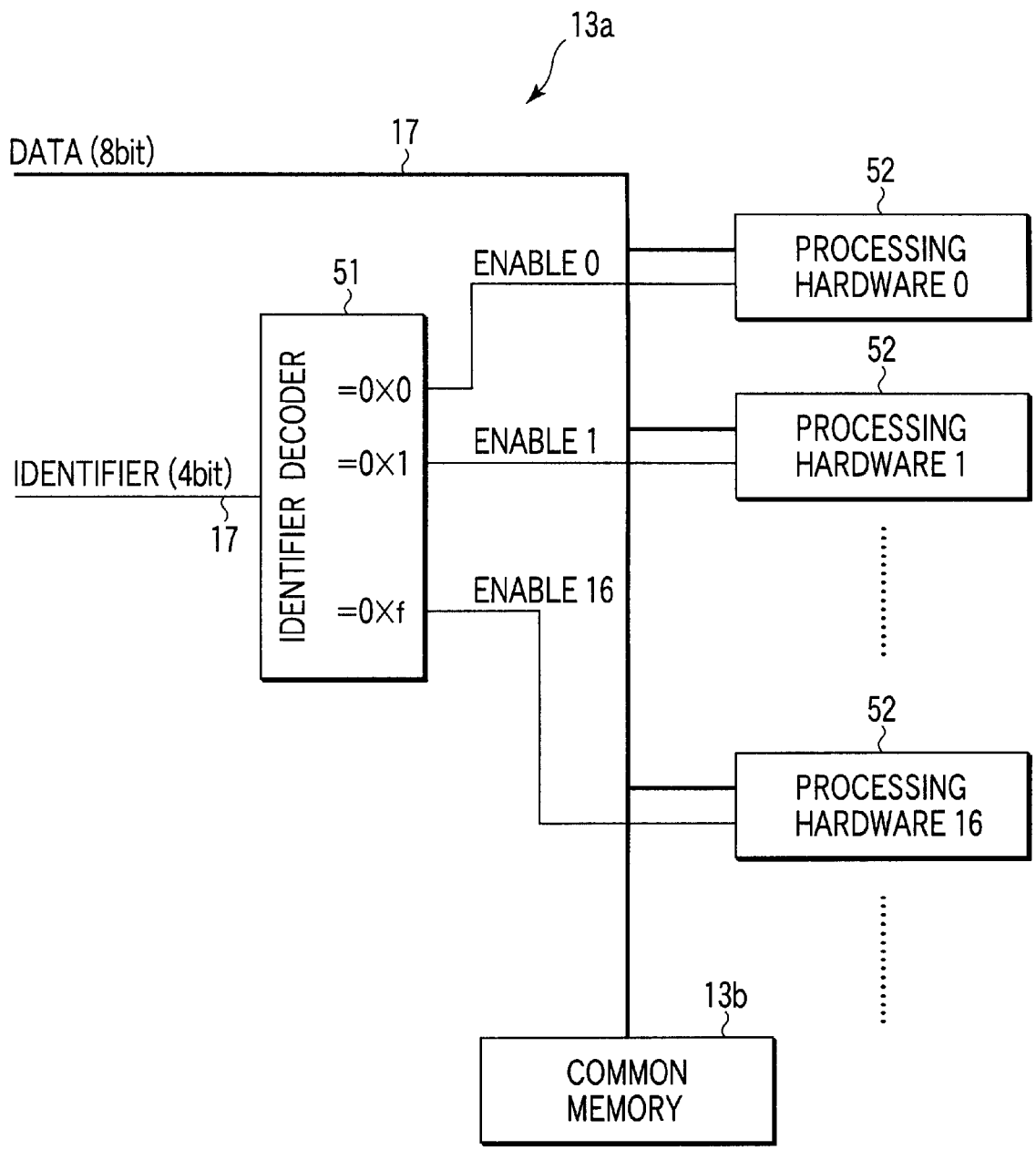
F I G. 9

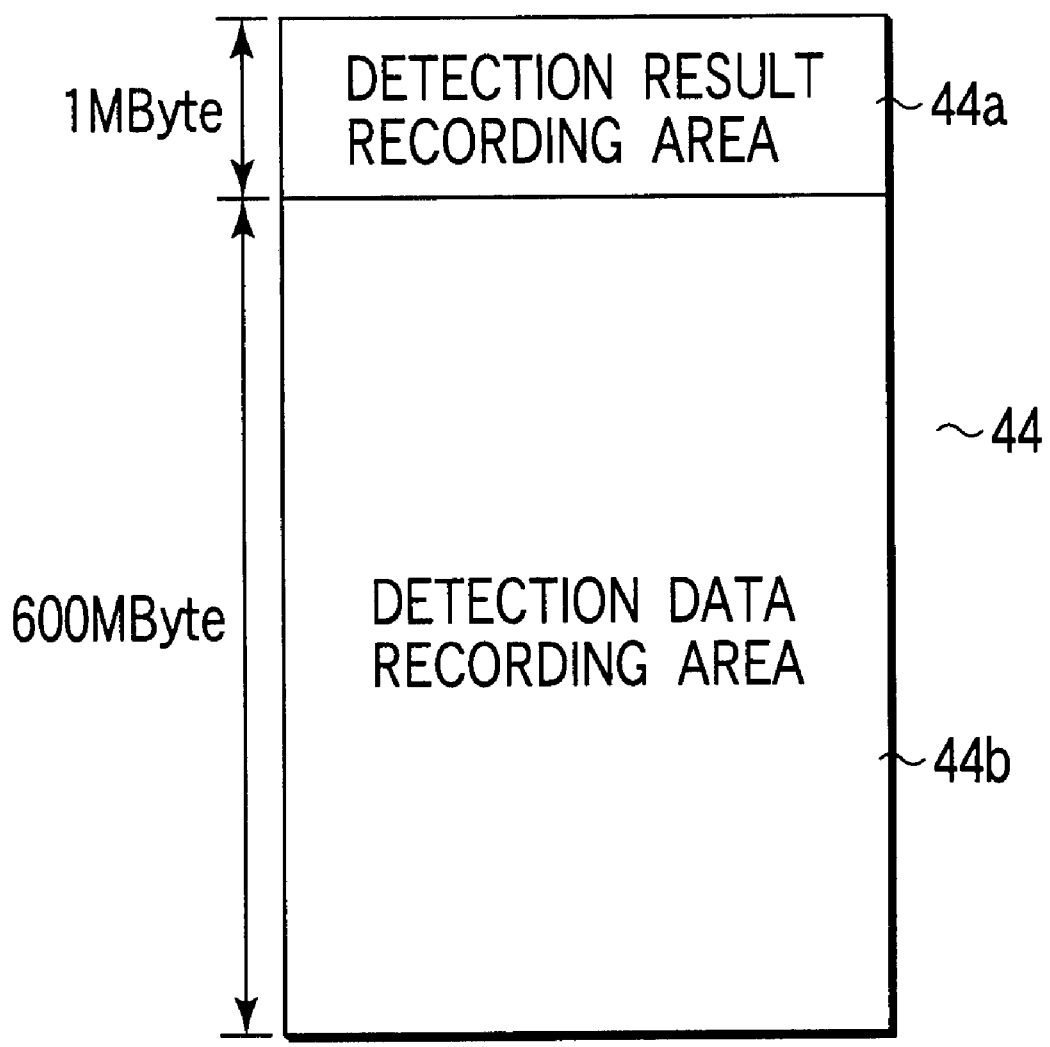
F I G. 14

SORTING OBJECTS BASED ON PHYSICAL CHARACTERISTICS

CROSS-REFERENCE TO RELATED APPLICATIONS

This application is based upon and claims the benefit of priority from the prior Japanese Patent Application No. 11-345297, filed Dec. 3, 1999, the entire contents of which are incorporated herein by reference.

BACKGROUND OF THE INVENTION

This invention relates to a to-be-detected object detecting device, a to-be-detected object detecting method and a to-be-detected object processing device for detecting that a to-be-detected object is a specified object based on the physical characteristic of the to-be-detected object fed on a feeding path.

Conventionally, as shown in FIG. 1, a detecting device for detecting various physical characteristics of a to-be-detected object fed on a feeding path has a plurality of sensor sections arranged on the feeding path in order to detect a plurality of physical characteristics of the to-be-detected object.

In the detecting device, to-be-detected objects are individually fed on the feeding path. Each of the sensor sections arranged on the feeding path selects one of the physical characteristics of the to-be-detected object which are desired to be detected. Generally, since it is desired to detect a plurality of physical characteristics of the to-be-detected object, various sensor sections for sensing various physical characteristics are arranged in various positions on the feeding path.

The physical characteristics of the to-be-detected object sensed by the sensor sections are supplied as electrical signals to a detection processing section via transmission paths. In the detection processing section, a process for detecting the physical characteristics of the to-be-detected object is effected based on the electrical signals supplied from the sensor sections. When the detection process for all of the physical characteristics is completed, the detection result is synthetically judged and a corresponding output is supplied to a generalizing section.

The generalizing section supplies an instruction corresponding to the detection result from the detection processing section to an object distributor and objects are distributed by the object distributor and stored in different storage boxes corresponding to the processing results.

FIG. 2 is a diagram showing an example of the construction of the sensor sections and detection processing sections of the conventional detecting device. As shown in FIG. 2, the physical characteristic of the to-be-detected object sensed by a sensor of each sensor section is converted into an electrical signal, amplified by an amplifier and supplied to a corresponding one of the detection processing sections corresponding in position to the respective sensor sections via a transmission path.

Each detection processing section converts the electrical signal supplied from a corresponding one of the sensor sections into digital data by use of an A/D converter, effecting the detection process in a detection processor and gives the detection result to a central processing unit by writing the detection result into a common memory provided between the detection processor and the central processing unit.

The central processing unit analyzes information detected based on the electrical signals acquired from the sensor sections and outputs a signal instructing a preset operation to a detection output section.

Generally, the processing time which can be taken for processing one to-be-detected object and the number (throughput) of to-be-detected objects which can be processed in unit time conflict with each other. Under a condition of a high speed detection process it is required that the processing time of each detection is limited, because it is impossible to carry out complicated calculations in a short time.

Therefore, a case wherein the detection result is determined as being indefinite or it is erroneously determined since the detection result is forcedly determined occurs in some cases.

Further, since the various sensors are arranged in various positions on the feeding path of the to-be-detected object, time for acquiring physical characteristic data of the to-be-detected object from the sensor is different depending on the position in which the sensor is arranged. Therefore, it is difficult to realize a processing method using physical characteristic data of the to-be-detected object acquired from various types of sensors from the standpoint of the processing speed and the cost of the hardware.

In the normal process, it is required that to-be-detected objects for which determination of detection cannot be made or to-be-detected objects which are required to be distributed into a more specific category are discriminated one by one by use of the five senses of an operator or the like or they are caused to pass through a detection processor which has substantially the same function as a normal detecting device including sensors and performs a precise examination process to obtain a final result.

BRIEF SUMMARY OF THE INVENTION

An object of this invention is to provide a to-be-detected object detecting device, a to-be-detected object detecting method and a to-be-detected object processing device capable of performing the detection process of high performance and enhancing the whole detection performance without lowering the number of to-be-processed objects of the to-be-detected objects in the normal detecting process.

According to a first aspect of this invention, there is provided a detecting device comprising first acquiring means for acquiring physical characteristic information obtained from a to-be-detected object; storage means for storing the physical characteristic information acquired by the first acquiring means together with specified data which specifies the to-be-detected object; first determining means for determining that the to-be-detected object corresponding to the physical characteristic information acquired by the first acquiring means is a specified object based on the physical characteristic information; second acquiring means for acquiring corresponding physical characteristic information from the storage means based on the specified data of the to-be-detected object when the first determining means has determined that the to-be-detected object is a specified object; and second determining means for making a more precise determination than the determination by the first determining means with respect to the to-be-detected object based on the physical characteristic information acquired by the second acquiring means.

According to a second aspect of this invention, there is provided a detecting method comprising a first step of acquiring physical characteristic information obtained from a to-be-detected object; a second step of storing the physical characteristic information acquired by the first step together with specified data which specifies the to-be-detected object; a third step of determining that the to-be-detected object corresponding to the physical characteristic information acquired by the first step is a specified object based on the physical characteristic information; a fourth step of acquiring corresponding physical characteristic information from the second step based on the specified data of the to-be-detected object when it is determined in the third step that the to-be-detected object is a specified object; and a fifth step of making a more precise determination than the determination in the third step with respect to the to-be-detected object based on the physical characteristic information acquired by the fourth step.

According to a third aspect of this invention, there is provided a to-be-detected object processing device comprising first acquiring means for acquiring physical characteristic information obtained from a to-be-detected object; storage means for storing the physical characteristic information acquired by the first acquiring means together with specified data which specifies the to-be-detected object; first determining means for determining the to-be-detected object corresponding to the physical characteristic information acquired by the first acquiring means based on the physical characteristic information; storing means for distributing and storing the to-be-detected object corresponding to the determination result by the first determining means into a first storing section based on the determination result and distributing and storing the to-be-detected object for which determination result by the first determining means has not been obtained into a second storing section; second acquiring means for acquiring corresponding physical characteristic information from the storage means based on information indicating the to-be-detected object for which determination result by the first determining means has not been obtained; second determining means for making a more precise determination than the determination by the first determining means with respect to the to-be-detected object based on the physical characteristic information acquired by the second acquiring means; and processing means having the second storing section set therein, for sequentially taking out the to-be-detected objects stored in the second storing section and storing the to-be-detected objects into third storing sections of different categories based on the determination result by the second determining means.

According to a fourth aspect of this invention, there is provided a to-be-detected object processing device comprising first acquiring means for acquiring physical characteristic information obtained from a to-be-detected object; storage means for storing the physical characteristic information acquired by the first acquiring means together with specified data which specifies the to-be-detected object; first determining means for determining the to-be-detected object corresponding to the physical characteristic information acquired by the first acquiring means based on the physical characteristic information; distributing means for distributing the to-be-detected object corresponding to the determination result by the first determining means into a first storing section, and the to-be-detected object for which a determination result has not been obtained into a delaying feeding path based on the determination result; second acquiring means for acquiring corresponding physical characteristic information from the storage means based on information indicating the to-be-detected object for which determination result by the first determining means has not been obtained; second determining means for making a more precise determination than the determination by the first determining means with respect to the to-be-detected object based on the physical characteristic information acquired by the second acquiring means; and processing means for storing the to-be-detected object fed by the delaying feeding path into one of a plurality of second storing sections of different categories based on the determination result by the second determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing the schematic construction of a to-be-detected object processing device according to a first embodiment of this invention;

FIG. 9 is a diagram showing an example of the construction of a detection processor;

FIG. 14 is a diagram showing an example of the construction of the storage area of a data storage medium;

DETAILED DESCRIPTION OF THE INVENTION

Figure 1:
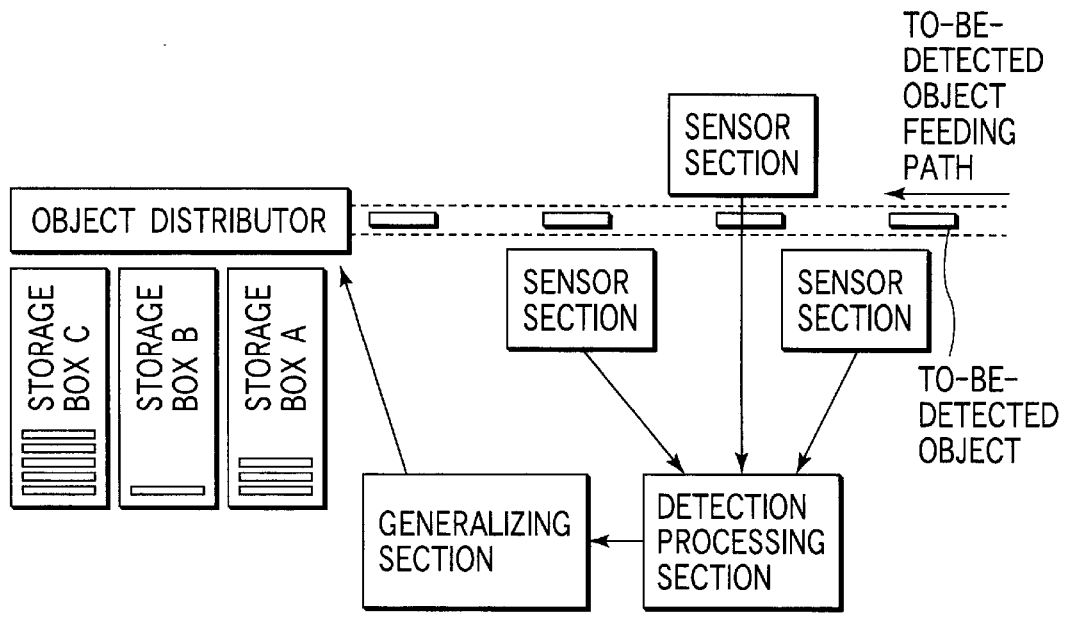
FIG. 1 is a diagram showing the schematic construction of a conventional detecting device.
Figure 2:
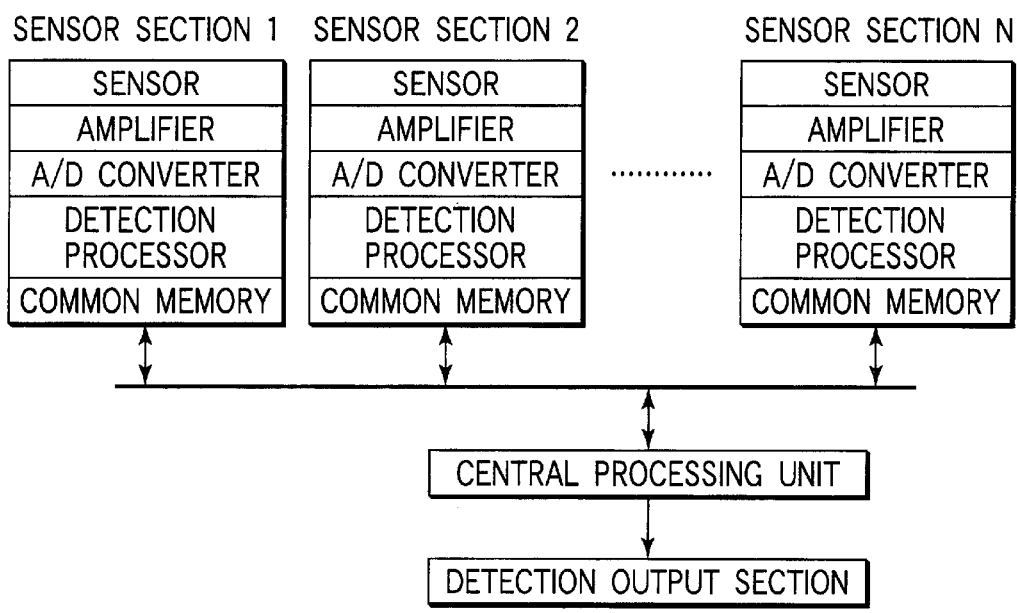
FIG. 2 is a diagram showing the schematic construction of a conventional detecting device.

There will now be described embodiments of this invention with reference to the accompanying drawings.

First, a first embodiment is explained.

FIG. 3 is a diagram showing the schematic construction of a to-be-detected object processing device (detecting system) for processing a to-be-detected object S.

The to-be-detected object processing device includes a feeding path 1, detecting device 2, object distributor 3, a plurality of storage boxes 4a, 4b, . . . , storage boxes 5, and a sorter (processing means) 6.

The feeding path 1 is used for individually feeding to-be-detected objects S supplied from a supplier (not shown) and each having various physical characteristics (physical characteristic information). The detecting device 2 detects various physical characteristics of the to-be-detected object S fed by the feeding path 1 by use of two types of detection processes including first and second detection processes.

As the various physical characteristics, the image pattern of an image on the to-be-detected object S, infrared, ultraviolet, visible light information as light information on the to-be-detected object S, thickness information of the to-be-detected object S may be provided. Further, modified data of the above information can be provided. As the modified data, information obtained by dividing the to-be-detected object S, taking a difference between the detection results of the adjacent areas detected and storing the difference is used, for example.

The object distributor 3 distributes the to-be-detected object S fed by the feeding path 1 according to the detection result of the first detection process of the detecting device 2. The storage boxes 4a, 4b, each store the to-be-detected object S distributed by the object distributor 3. The sorter (processing means) 6 sorts and moves the to-be-detected objects S from the storage box 4c to another storage box 5 based on the detection result (detection result from a precise examination processing section 16 which will be described later) of the second detection process of the detecting device 2.

If the object distributor 3 distributes the to-be-detected object S fed by the feeding path 1 based on an instruction corresponding to the detection result from a generalizing section 15 which will be described later, the to-be-detected object S is stored in one of the storage boxes 4a, 4b, . . . corresponding to the detection result.

The storage box 4c is treated as a storage box of the to-be-detected object S which requires precise examination.

The first detection process in the detecting device 2 is a detection process (normal detection process) effected in a feeding period of time (restriction of the detection processing time) from when the to-be-detected object S comes to face one of sensor sections 11 which will be described later until it reaches the object distributor 3.

The second detection process in the detecting device 2 is a detection process of high-degree algorithm on which no time limit is imposed or which takes a long processing time and is a higher degree detection process than the first detection process. As the second detection process, a detection process for a large amount of processes such as FFT (Fast Fourier Translation) is provided.

Figures 4, 5, 6:
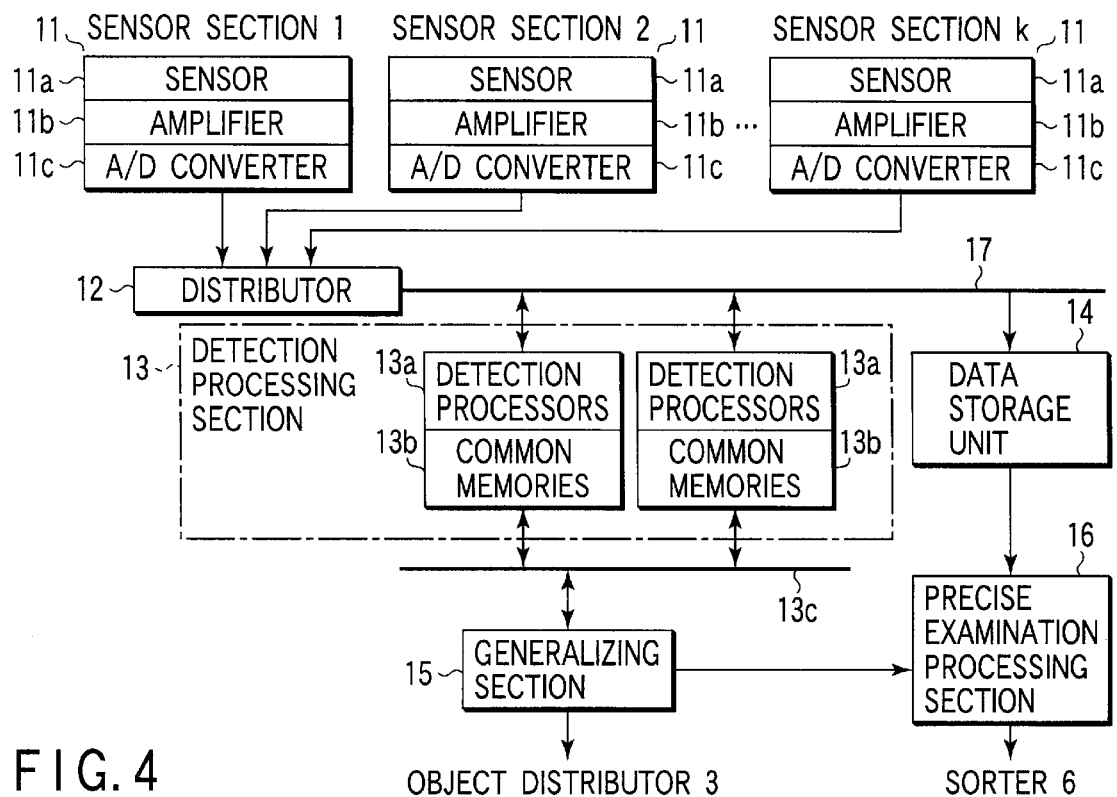
FIG. 4 is a block diagram showing the schematic construction of the main portion of a to-be-detected object processing device.
FIG. 5 is a diagram showing the number of index information items output from a generalizing section and an index information string of a to-be-detected object which is subjected to the precise examination process.
FIG. 6 is a diagram showing a data string constructed by detection results each corresponding to an index number indicating the order of a to-be-detected object output from a precise examination processing section.

As shown in FIGS. 3, 4, the detecting device 2 includes a plurality of sensor sections (first acquiring means) 11, distributor 12, detection processing section 13, data storage unit (storage means) 14, generalizing section (first determining means) 15 and precise examination processing section (second acquiring means, second determining means) 16. The distributor 12 is connected to the detection processing section 13 and data storage section 14 via a data bus 17.

The sensor sections 11 detect (sense) various physical characteristics the to-be-detected object S fed on the feeding path 1. Since a plurality of physical characteristics of the to-be-detected object S which are to be sensed are provided, a plurality of types of sensor sections 11 corresponding to the physical characteristics to be sensed are arranged in various positions on the feeding path 1. Detection outputs of the sensor sections 11 are supplied to the distributor 12.

The sensor section 11 includes a sensor 11a, amplifier 11b and A/D converter 11c.

The sensor 11a converts the physical characteristics of the to-be-detected object S fed on the feeding path 1 into an analog electrical signal. The amplifier 11b amplifies the analog electrical signal from the sensor 11a. The A/D converter 11c converts the analog electrical signal amplified by the amplifier 11b into a digital signal and outputs the same together with a clock signal to the distributor 12.

The distributor 12 supplies the detection outputs from the sensor sections 11, that is, the various physical characteristics of the to-be-detected object S to the detection processing section 13 and data storage unit 14. The distributor 12 replaces the detection outputs of each scanning line which are asynchronously supplied in parallel from the sensor sections 11 by series output data and outputs the same to the detection processing section 13 when the next scanning line is scanned. The distributor 12 effects the above replacing operation by use of a horizontal sync. signal and reference clock supplied from the generalizing section (central processing unit) 15.

The detection processing section 13 includes a plurality of detection processors 13a and a plurality of common memories 13b and performs the detection process based on the various physical characteristics supplied from the sensor sections 11 for each to-be-detected object S. One detection processor 13a and one common memory 13b make a set and the result of the detection process based on the physical characteristics by the detection processor 13a is stored into the corresponding common memory 13b. The common memories 13b are connected via a bus 13c and commonly used by the generalizing section 15. The detection processor 13a is provided for effecting the detection process (normal detection process, first detection process) which is effected in a feeding period of time until the corresponding to-be-detected object S reaches the object distributor 3.

The data storage unit 14 stores various physical characteristics (each including an identifier indicating a corresponding one of the sensor sections 11 from which data is supplied) of the to-be-detected object S from the sensor sections 11 after index information (specified data) of the corresponding to-be-detected object S supplied from the generalizing section 15 is attached to the above physical characteristics.

For example, the index information of the to-be-detected object S is a serial number which is sequentially attached to the to-be-detected objects S sequentially fed on the feeding path 1 while "0" is set at the starting time of the detection system and it is supplied from the generalizing section 15. As explained in FIG. 3, the reason why the index information is given is that data items of the same to-be-detected object are input at different timings from the respective sensor sections 11 since the sensor sections 11 are arranged in various positions on the feeding path 1 and it is difficult to distinguish the data items only based on the data items.

The generalizing section 15 is constructed by a central processing unit. The generalizing section 15 is supplied with the result of the detection process based on the various physical characteristics of each to-be-detected object S from the detection processing section 13 (that is, read out from the common memories 13b) and synthetically determines the detection result based on the results of the detection processes. Further, the generalizing section 15 outputs an instruction corresponding to the synthetic detection result to the object distributor 3 within a certain period of time (on the real-time basis) in which the corresponding to-be-detected object S is fed to the object distributor 3. In this case, if the detection result cannot be determined within the above certain period of time, the generalizing section 15 outputs an instruction corresponding to the absence of the detection result to the object distributor 3, before the corresponding to-be-detected object S is fed to the object distributor 3.

Thus, the object distributor 3 distributes and stores the to-be-detected object S into the storage box 4a, 4b based on the instruction corresponding to the detection result from the generalizing section 15 and stores the to-be-detected object S into the distribution storage box 4c based on the instruction corresponding to the absence of the detection result from the generalizing section 15.

If the detection result cannot be determined within the above period of time, the generalizing section 15 outputs the index information of the corresponding to-be-detected object S as the detection result which requires the precise examination to the precise examination processing section 16. The detection result which requires the precise examination is sequentially output to the precise examination processing section 16 or it is output when a preset amount of to-be-processed objects are stored. As shown in FIG. 5, when it is collectively output, the number of index information items and an index information (for example, five bits) string of to-be-detected objects to be subjected to the precise examination process are output.

The precise examination processing section 16 receives the number of index information items and index information string from the generalizing section 15, reads out corresponding data for each received index information item one by one from the data storage unit 14 and performs the detection process (second detection process, FFT, for example) of high-degree algorithm. The precise examination processing section 16 outputs an instruction corresponding to the detection result to the sorter 6 together with an index number (corresponding to the storing order of the to-be-detected objects S in the storage box 4c).

The storage box 4c is set as a to-be-sorted object of the sorter 6 by use of a method for manually or automatically moving the storage box along a rail (not shown).

The sorter 6 selectively stores the to-be-detected objects S into storage boxes 5 based on the detection result for each index number from the precise examination processing section 16 and the take-out order of the to-be-detected objects S taken out from the storage box 4c. Thus, the to-be-detected object S is stored in one of the storage boxes 5 corresponding to the category of the to-be-detected object S as the detection result from the precise examination processing section 16. The sorter 6 includes a take-out roller 21 for sequentially taking out the to-be-detected objects S one by one from the storage box 4c which is set, a feeding path 22 for feeding the to-be-detected object S taken out by the take-out roller 21, gates 23 for selectively distributing the to-be-detected objects S fed by the feeding path 22 into the storage boxes 5, and a control section 24 for controlling the switching positions of the gates 23 based on the detection result from the precise examination processing section 16.

At this time, the to-be-detected objects S are distributed into the storage boxes 5 by use of information such as an order of the to-be-detected objects S stored in the storage box 4c or by reading symbol numbers (index information) contained in securities or the like as the to-be-detected objects S by use of an OCR (not shown) and attaching the read symbol number to stored data.

When the to-be-detected objects S are distributed into the storage boxes 5 by use of information such as an order of the to-be-detected objects S stored in the storage box 4c, a data string formed of the detection result corresponding to the index number indicating the order of the to-be-detected object S stored in the storage box 4c is supplied from the precise examination processing section 16 to the control section 24 as shown in FIG. 6. As a result, the control section 24 sequentially takes out the to-be-detected objects S one by one from the set storage box 4c based on the data string and distributes and store the to-be-detected objects S in the storage boxes 5. The index number is newly assigned to the to-be-detected object S which has been subjected to the precise examination process.

Figures 7, 8:
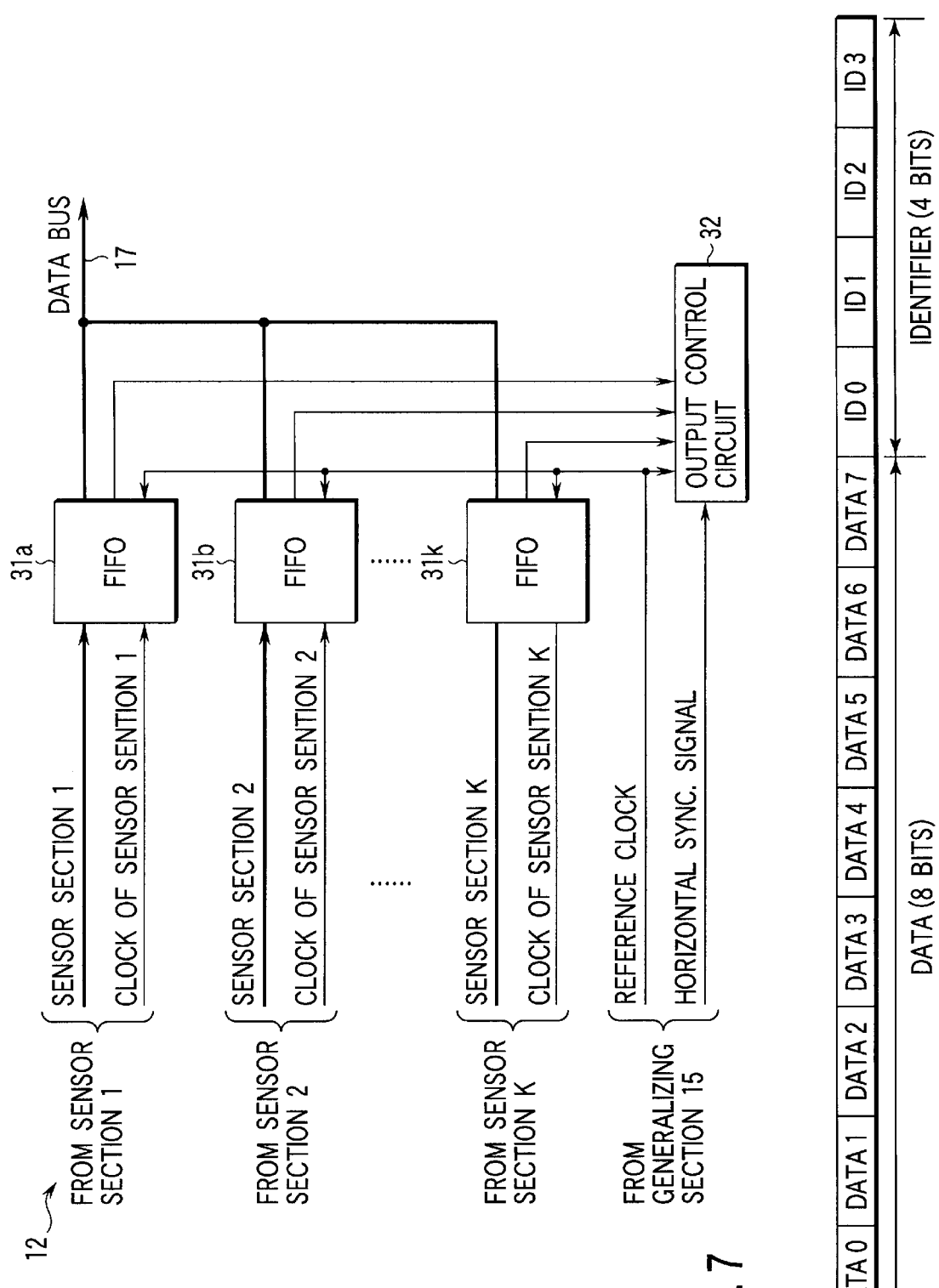
FIG. 7 is a diagram showing an example of the circuit construction of a distributor.
FIG. 8 is a diagram showing a data string relating to data storage.

FIG. 7 shows an example of the circuit construction of the distributor 12. The circuit includes first-in first-out (FIFO) type FIFO memories 31a, 31b, . . . , 31k to which the electrical signals and clock signals from the A/D converters 11c of the respective sensor sections 11 are input, and an output control circuit 32 for controlling output of data of the FIFO memories 31a, 31b, . . . to a data bus 17 as output data having data items of a width corresponding to the number of bits of the data bus 17 serially arranged according to the reference clock and horizontal sync. signal supplied from the central processing unit 15.

The input signals input to the FIFO memories 31a, 31b, . . . are digital signals which are asynchronous from one another and each supplied at an interval based on the frequency of the clock (first clock) of a corresponding one of the A/D converters 11c of the sensor sections 11. Each of the FIFO memories 31a, 31b, . . . converts the input signal into data having a data width of 8 bits.

Further, as shown in FIG. 8, the FIFO memories 31a, 31b, . . . create output data of 12-bit unit by attaching a 4-bit identifier indicating one of the sensor sections 11 from which the 8-bit data is supplied to the 8-bit data. The output data of 12-bit unit created in each of the FIFO memories 31a, 31b, . . . is output to the 12-bit data bus 17 as series data of 12-bit unit at an interval based on the frequency of the reference clock (second clock) higher than the frequency of the clock (first clock) of the A/D converter 11c by the output control circuit 32.

As shown in FIG. 9, the detection processor 13a includes an identifier decoder 51 for decoding a 4-bit identifier and selectively outputting an enable signal and a plurality of processing hardwares 52 for performing the detection process based on different physical characteristics. The identifier decoder 51 outputs an enable signal to a corresponding one of the processing hardwares 52 based on the 4-bit identifier in the 12 bits supplied from the distributor 12 via the data bus 17 so as to permit data of the remaining 8 bits in the 12 bits supplied from the distributor 12 via the data bus 17 to be received into and processed by the processing hardware 52 which is supplied with the enable signal.

Thus, the detection process is performed by the processing hardware 52 which performs the detection process corresponding to the physical characteristic of the sensor section 11.

The result of the detection process of each processing hardware 52 is stored in a corresponding one of the common memories 13b.

Figure 10:
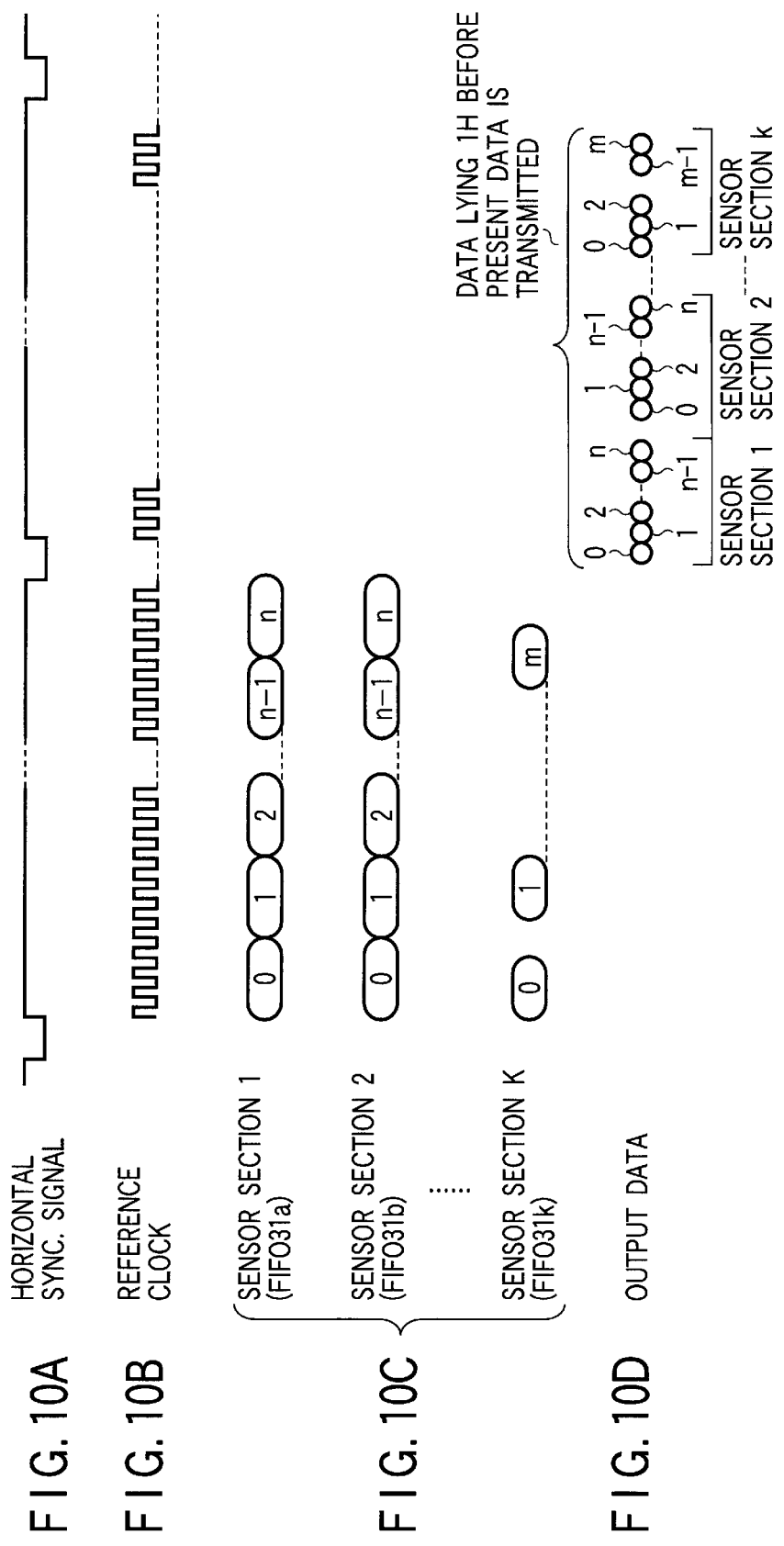
FIGS. 10A to 10D are timing charts for illustrating the relation between a horizontal sync. signal, reference clock, input/output signals from the respective sensors and output data.

The output control circuit 32 stores data of one scanning line from each of the sensor sections 11 shown in FIG. 10C into a corresponding one of the FIFO memories 31a, 31b, based on the horizontal sync. signal and reference clock shown in FIGS. 10A, 10B. Then, as shown in FIG. 10D, the output control circuit 32 sequentially outputs data to the data bus 17 in an order from the data (including the 4-bit identifier) stored in the FIFO memory 31a according to the horizontal sync. signal and reference clock.

As a result, the detection outputs of each scanning line which are asynchronously supplied in parallel from the sensor sections 11 are replaced by series output data and output to the detection processing section 13 when the next one scanning line is scanned.

The data storage unit 14 collects data by writing output data output from the distributor 12 to the data bus 17 together with the identifier attached to each data and index information of the to-be-detected object S supplied from the generalizing section 15.

Figure 11:
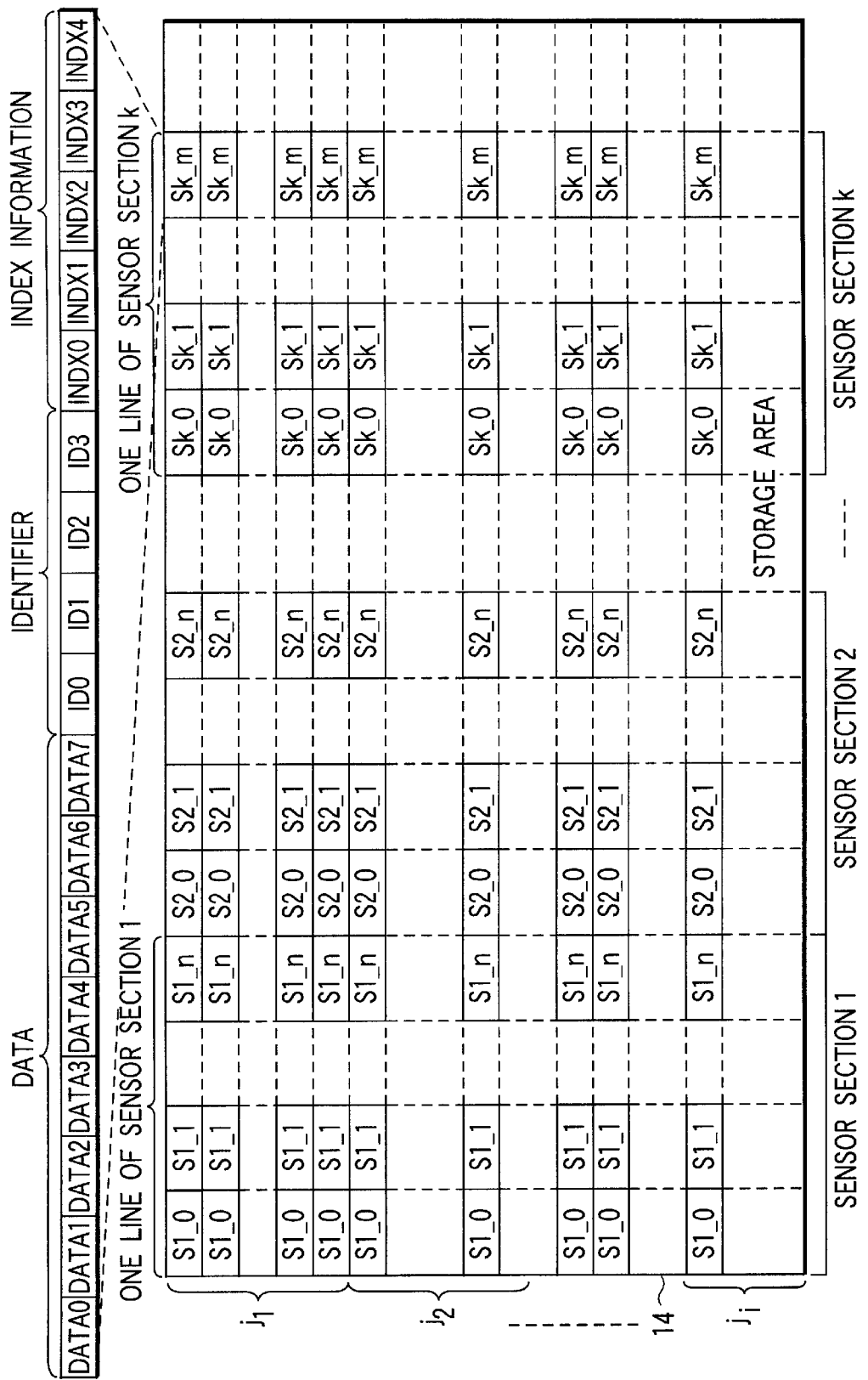
FIG. 11 is a diagram for illustrating data collected by a data storing unit.

FIG. 11 is a diagram showing one example of data collected by the data storage unit 14. In FIG. 11, it is assumed that the number of sensor sections 11 is k, the number of data items of one line of the sensor section 1, sensor section 2 among them is n, the number of data items of one line of the sensor section k is m, the number of lines of data (the number of scanning lines in each of the to-be-detected object S) collected by the sensor sections 1 to k is j, the number of to-be-detected objects S is i, the data width is 8 bits, an identifier indicating the sensor section 11 is 4 bits, and index information (INDEX) indicating the to-be-detected object S is 5 bits.

That is, in FIG. 11, data items S1_0 to S1_n in the upper left portion indicate data of the first line of the sensor section 1 and, for example, they indicate data corresponding to a signal of one line from each CCD of the sensor section 11a. each data S1_0 is constructed by 8-bit data, 4-bit identifier and 5-bit index information.

Further, data items S1_0 to S1_n of a plurality of scanning lines corresponding to j1 in the upper left portion indicate data of the sensor section 1 corresponding to a first one of the to-be-detected objects S.

Further, data items S2_0 to S2_n of a plurality of scanning lines corresponding to j1 in the upper left portion indicate data of the sensor section 2 corresponding to the first one of the to-be-detected objects S.

In addition, data items Sk_0 to Sk_n of a plurality of scanning lines corresponding to j1 indicate data of the sensor section k corresponding to the first one of the to-be-detected objects S.

Further, data items S1_0 to S1_n of a plurality of scanning lines corresponding to j2 indicate data of the sensor section 1 corresponding to a second one of the to-be-detected objects S.

Further, data items S2_0 to S2_n of a plurality of scanning lines corresponding to j2 indicate data of the sensor section 2 corresponding to the second one of the to-be-detected objects S.

In addition, data items Sk_0 to Sk_n of a plurality of scanning lines corresponding to j2 indicate data of the sensor section k corresponding to the second one of the to-be-detected objects S.

Further, data items S1_0 to S1_n of a plurality of scanning lines corresponding to ji indicate data of the sensor section 1 corresponding to an i-th one of the to-be-detected objects S.

Further, data items S2_0 to S2_n of a plurality of scanning lines corresponding to ji indicate data of the sensor section 2 corresponding to the i-th one of the to-be-detected objects S.

In addition, data items Sk_0 to Sk_n of a plurality of scanning lines corresponding to ji indicate data of the sensor section k corresponding to the i-th one of the to-be-detected objects S.

The index information shown in FIGS. 5, 8, 11 is not limited to a 5-bit construction, but may have an 8-bit construction.

Further, a case wherein the to-be-detected objects S are distributed into the storage boxes 5 according to the category based on the detection result by use of the sorter 6 based on the detection result of the to-be-detected object S received in the storage box 4c which is output from the precise examination processing section 16 is explained, but it is possible to output the detection result which has been subjected to the precise examination process by the precise examination processing section 16 for each case or for every preset number of cases by use of an output device such as a display or printer. In this case, based on the output contents, the operator selectively distributes the to-be-detected objects S received in the storage box 4c into the storage boxes 5.

Next, the operation of the device with the above construction is explained.

To-be-detected objects S are sequentially taken out from a supplying section (not shown) and fed on the feeding path 1, the physical characteristics of the to-be-detected objects S are detected by the sensor sections 11 and the detection outputs are supplied to the distributor 12.

At this time, the generalizing section 15 creates index information for each of the to-be-detected objects S sequentially taken out from the supplying section and manages the same while effecting the feeding control.

The distributor 12 supplies the detection outputs from the sensor sections 11, that is, various physical characteristics of the to-be-detected objects S to the detection processing section 13 and data storage unit 14.

The data storage unit 14 attaches the index information of the to-be-detected object S supplied from the generalizing section 15 to the various physical characteristics (including an identifier) of the to-be-detected object S from the sensor sections 11 and stores them.

The detection processing section 13 performs the detection process based on the various physical characteristics of each to-be-detected object S from the sensor sections 11.

As a result, the generalizing section 15 receives the result of the detection process based on the various physical characteristics for each to-be-detected object S read out from the common memories 13b of the detection processing section 13, synthetically determines the detection result based on the result of the detection process and outputs an instruction corresponding to the detection result to the object distributor 3 within a certain period of time (on the real-time basis) in which the to-be-detected object S is fed to the object distributor 3. In this case, if the detection result cannot be determined within the above certain period of time, the generalizing section 15 outputs an instruction corresponding to the absence of the detection result to the object distributor 3, before the to-be-detected object S is fed to the object distributor 3.

As a result, the object distributor 3 distributes and stores the to-be-detected objects S in the storage boxes 4a, 4b according to the instruction corresponding to the detection result from the generalizing section 15 and stores the to-be-detected objects S in the storage box 4c according to the instruction corresponding to the absence of the detection result from the generalizing section 15.

Further, the generalizing section 15 outputs the number of index information items and index information string of the to-be-detected objects subjected to the precise examination process as the detection result which requires the precise examination process to the precise examination processing section 16. The number of index information items and index information string of the to-be-detected objects subjected to the precise examination process correspond to the to-be-detected objects S stored in the storage box 4c.

As a result, the precise examination processing section 16 receives the number of index information items and index information string from the generalizing section 15, reads out data corresponding to each of the received index information items from the data storage unit 14 one by one, performs the detection process of high-degree algorithm, and stores the detection result after attaching a new index number (corresponding to an order in which the to-be-detected objects S are stored in the storage box 4c) to the detection result.

The storage box 4c is set as a to-be-sorted object of the sorter 6 by use of a method for manually or automatically moving the storage box along a rail (not shown). At this time, a list of detection results (refer to FIG. 6) of the precise examination processing section 16 each having an index number attached thereto is output to the sorter 6.

Then, the sorter 6 sequentially takes out the to-be-detected objects S of the storage box 4c and selectively stores (distributes) the to-be-detected object S into the storage boxes 5 based on the detection result for each index number corresponding to the taken-out to-be-detected object S. Thus, the to-be-detected objects S are stored into the storage boxes 5 corresponding to the categories of the to-be-detected objects S as the detection results from the precise examination processing section 16.

As described above, in a device for processing the to-be-detected objects by use of the detection system capable of effecting the high-speed detection process, detection results indicating the physical characteristics obtained from the sensor sections and associated with the to-be-detected objects for which it is determined that determination of detection is difficult to make by the high-speed detection process are stored in the data storage unit. The detection process is effected for the to-be-detected objects which are determined to require the precise examination process by the high-speed detection process on the non-real time basis in the precise examination processing section by use of data stored in the data storage unit and then the to-be-detected objects are distributed into the storage box corresponding to the category of the to-be-detected object obtained as the detection result from the precise examination processing section.

Figure 12:
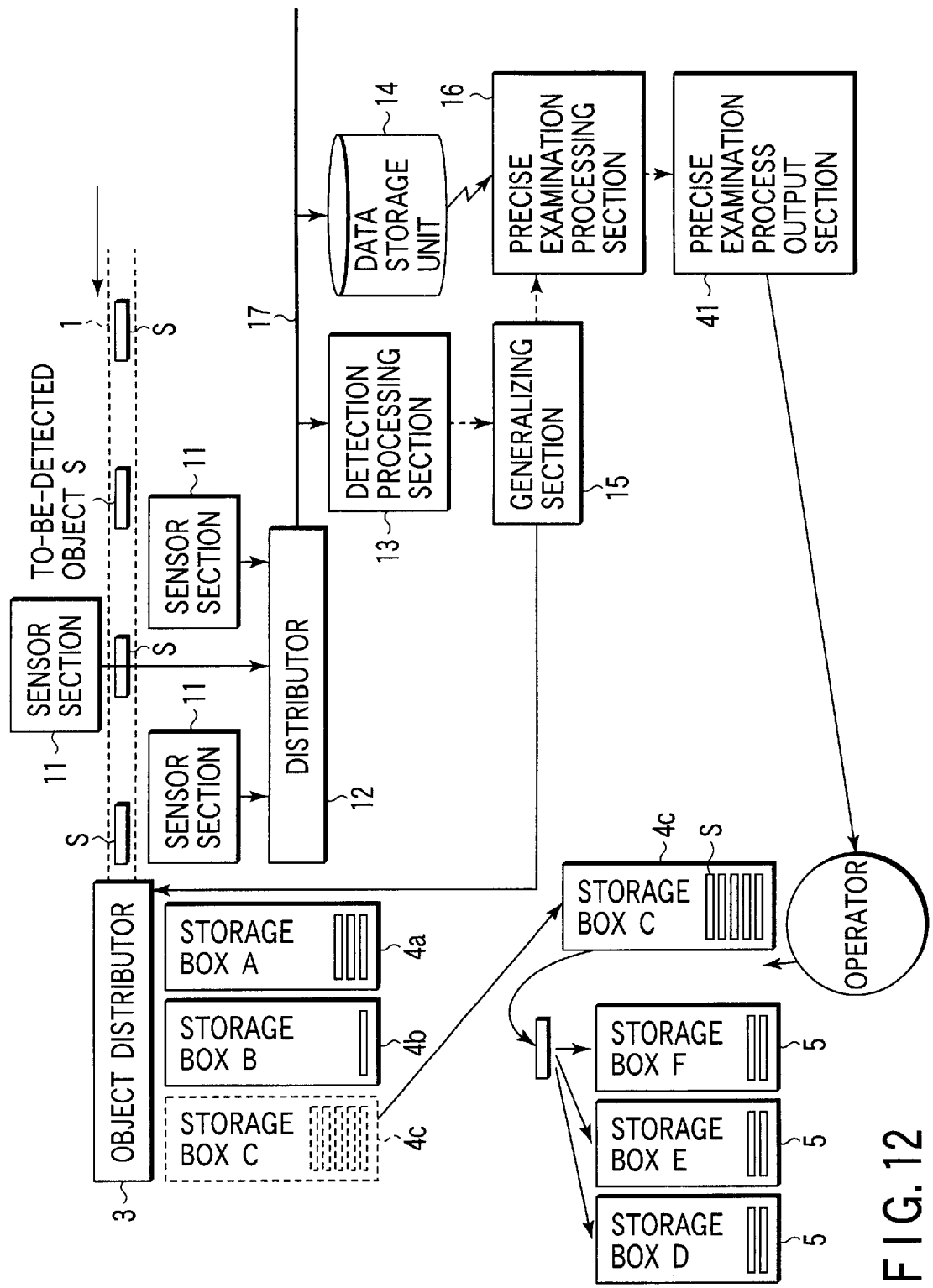
FIG. 12 is a diagram showing the schematic construction of a to-be-detected object processing device according to a second embodiment of this invention.

In the first embodiment, a case wherein the to-be-detected objects S stored in the storage box 4c by the sorter 6 are distributed into the storage boxes 5 corresponding to the categories of the to-be-detected objects S according to the detection result based on the detection process of high-degree algorithm in the precise examination processing section 16 is explained, but this invention is not limited to this case. For example, as shown in FIG. 12, in a second embodiment, it is possible to provide a display or printer as a precise examination process output section (output means) 41 for outputting the detection result of the precise examination processing section 16 and distribute the to-be-detected objects S stored in the storage box 4c into the storage boxes 5 corresponding to the categories of the to-be-detected objects S by the operator based on the display contents of the display or the print contents of the printer.

Figure 13:
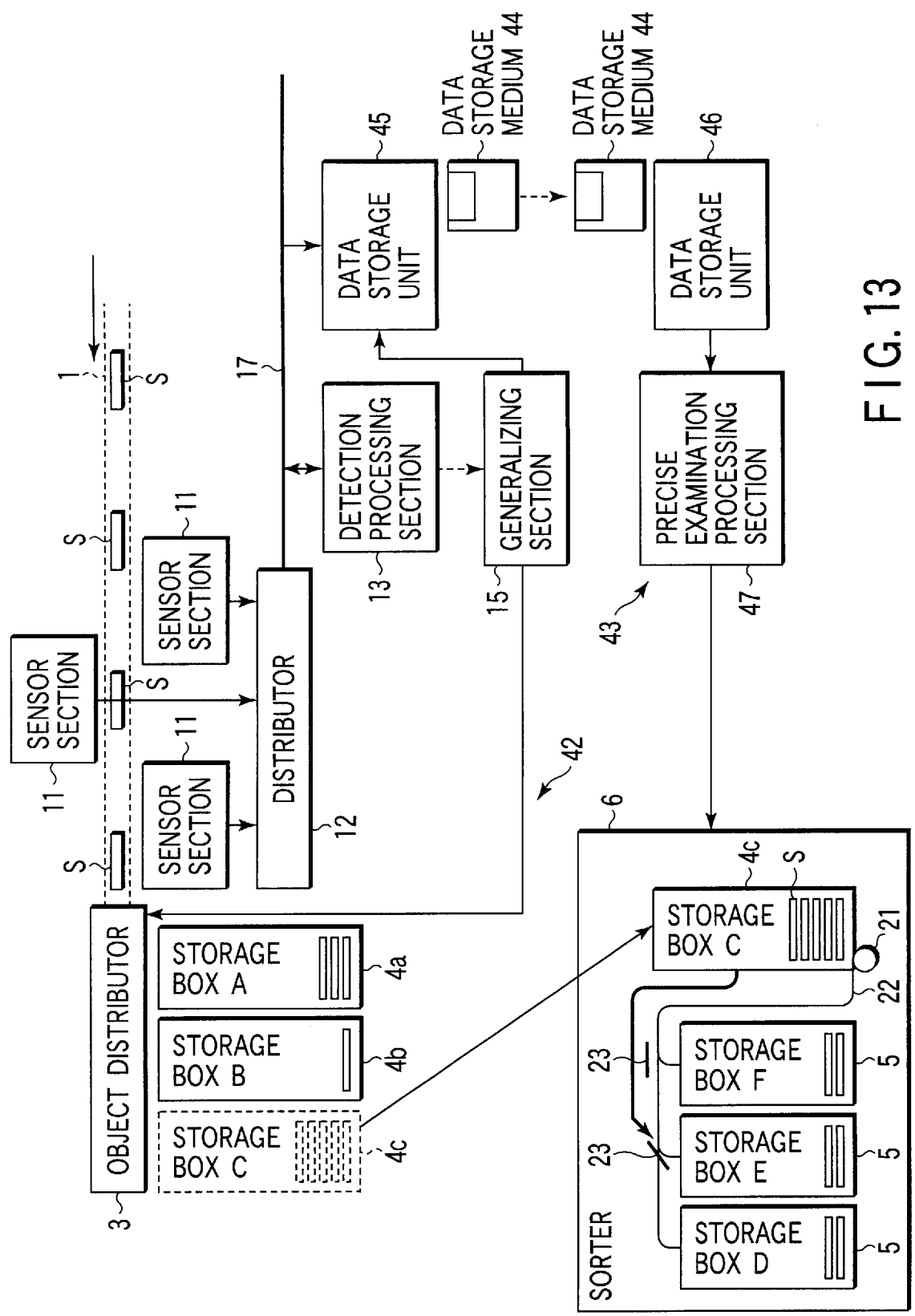
FIG. 13 is a diagram showing the schematic construction of a to-be-detected object processing device according to a third embodiment of this invention.

Further, in the first embodiment, a case wherein the precise examination processing section is provided in the detecting device is explained, but this invention is not limited to this case. As shown in FIG. 13, in a third embodiment, it is possible to separately provide a normal detecting device 42 and a precise examination detecting device 43 and use a data storage medium (storage medium) 44 for transferring data between the normal detecting device 42 and the precise examination detecting device 43.

In this case, it is possible to use one precise examination detecting device 43 for performing the precise examination detecting processes for a plurality of normal detecting devices 42.

As shown in FIG. 14, the storage medium 44 has a 1-Mbyte detection result recording area 44a and 600-Mbyte detection data recording area 44b. In the detection result recording area 44a, the number of index information items and index information string of the to-be-detected objects subjected to the precise examination process are recorded as the detection result which requires the precise examination process from the generalizing section 15. In the detection data recording area 44b, data obtained by attaching an identifier and index information to various physical characteristics of the to-be-detected object S supplied from the sensor sections 11 for each to-be-detected object S and stored in the data storage unit 14 in the first embodiment is recorded.

The normal detecting device 42 includes a plurality of sensor sections 11, distributor 12, detection processing section 13, data storage unit (storage means) 14, generalizing section 15, and object distributor 3 and the precise examination detecting device 43 includes a data storage unit (second acquiring means) 46, precise examination processing section 47 and sorter 6.

The data storage unit 45 records data obtained by attaching an identifier and index information to various physical characteristics of the to-be-detected object S supplied from the sensor sections 11 for each to-be-detected object S from the distributor 12 in the detection data recording area 44b of the recording data storage medium 44 and stores the number of index information items and index information string of the to-be-detected objects subjected to the precise examination process as the detection result which requires the precise examination process from the generalizing section 15 in the detection result recording area 44a.

The data storage unit 46 reads out data of the detection result recording area 44a of the recording data storage medium 44 and data of the detection data recording area 44b and outputs the readout data to the precise examination processing section 47. The precise examination processing section 47 receives the number of index information items and index information string from the recording result recording area 44a of the data storage unit 46, reads out data corresponding to each of the received index information items one by one from the detection data recording area 44b of the recording data storage medium 44 and performs the detection process (second detection process, FFT, for example) of high-degree algorithm. The precise examination processing section 47 outputs an instruction corresponding to the detection result together with the index number (corresponding to an order in which the to-be-detected object S are stored in the storage box 4c) to the sorter 6.

Further, as a fourth embodiment, it is possible to notify the contents of the special result when the detection result by the generalizing section is a special result.

Figure 15:
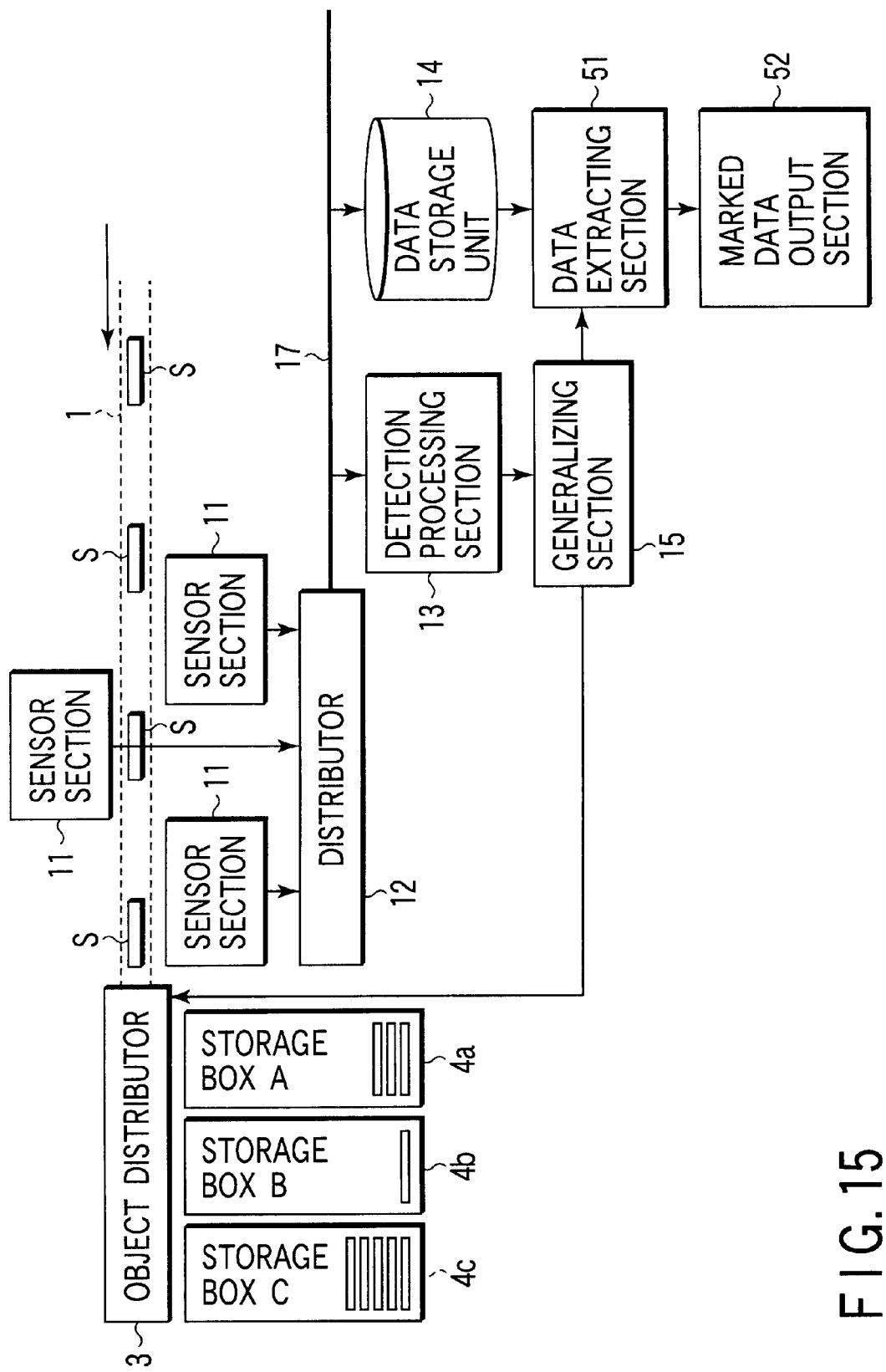
FIG. 15 is a diagram showing the schematic construction of a to-be-detected object processing device according to a fourth embodiment of this invention.

In this case, as shown in FIG. 15, the construction is made by omitting the precise examination processing section 16 and sorter 6 from the first embodiment shown in FIG. 3 and adding a data extracting section (processing means) 51 and marked data output section (output means) 52. The data extracting section 51 is connected to the generalizing section 15 and data storage unit 14. Index information corresponding to the detection result is supplied from the generalizing section 15 to the data extracting section 51 and data corresponding to the index information is read out from the data storage unit 14 and displayed on a display section used as the marked data output section 52.

In the above example, a case wherein a peculiar detection result is output immediately if it is generated is explained, but it is possible to store peculiar detection results occurring in a series of processes after the series of processes, for example, the detecting process for 1000 to-be-detected objects is completed and collectively output data constructed by the number of index information items and a plurality of index information strings as shown in FIG. 5 from the generalizing section 15 to the data extracting section 51.

In this case, in the data extracting section 51, the received data is decoded and detection data corresponding to the index information of the to-be-detected object is read out from the data storage unit 14. At this time, data can be determined and extracted based on the index information contained in the data and an identifier used as a sensor ID. In the data extracting section 51, a statistic value is calculated or data is converted into an image based on the readout data. At this time, in the data extracting section 51, a method for making calculations by use of a CPU or DSP (Digital Signal Processor) after data is temporarily stored into a memory (not shown) can be used. The data extracting section 51 outputs data which is obtained by modifying the stored data to the marked data output section 52. The marked data output section 52 displays the modified data for the operator, system manager or the like. At this time, in order to make a collation with the actual to-be-detected object, an image of the to-be-detected object or an identification number of the to-be-detected object acquired by use of means such as an OCR can be displayed.

Figure 16:
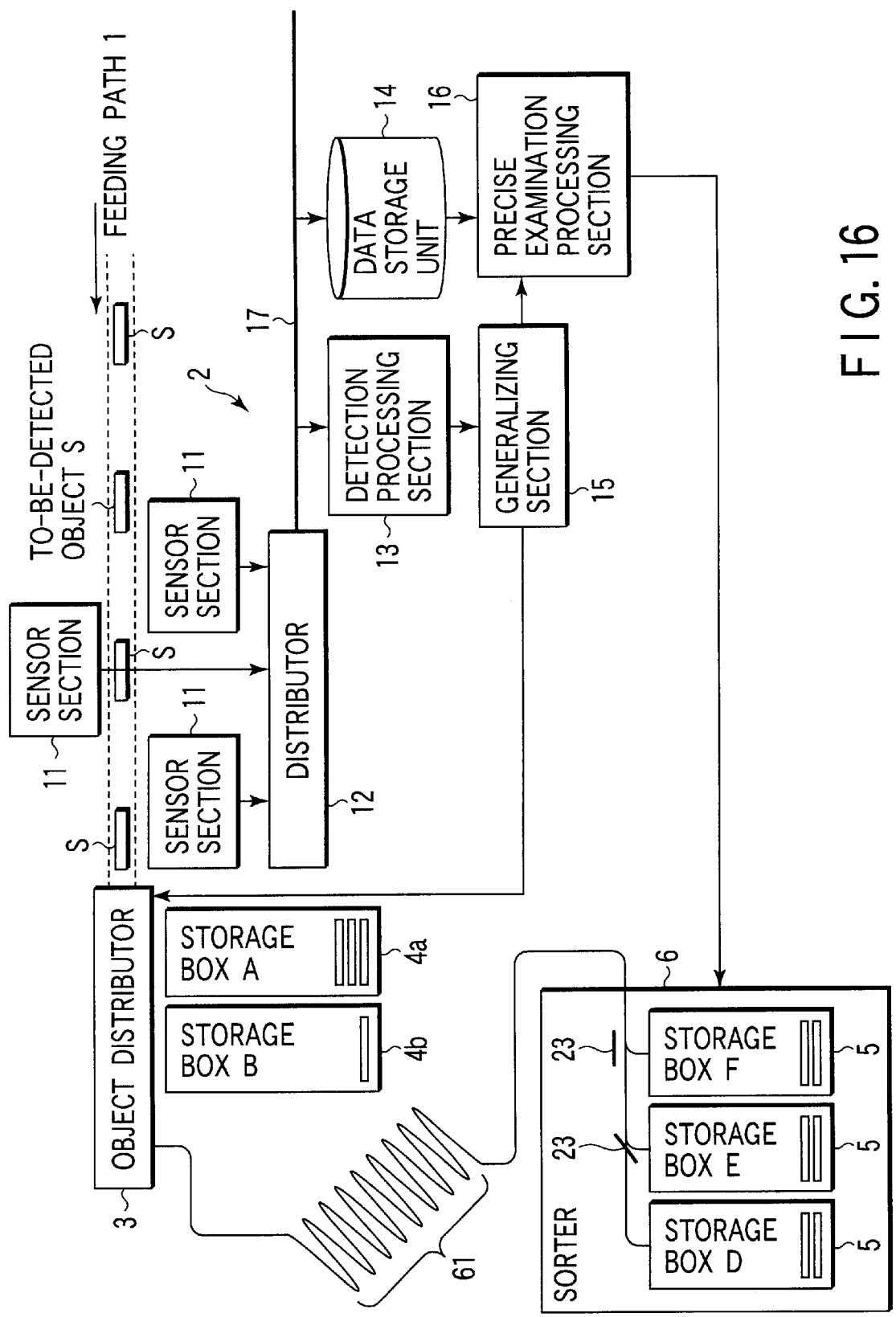
FIG. 16 is a diagram showing the schematic construction of a to-be-detected object processing device according to a fifth embodiment of this invention.

Further, in the first, second and third embodiments, a case wherein the to-be-detected objects S which require the precise examination process are distributed by the object distributor 3 and stored in the storage box 4c, then the storage box 4c is set as a to-be-sorted object of the sorter 6 by use of a method for manually or automatically moving the storage box along a rail, and the to-be-detected objects S stored in the storage box 4c are distributed into the storage boxes 5 corresponding to the categories of the to-be-detected objects S by the sorter 6 according to the detection result based on the detecting process of high-degree algorithm in the precise examination processing section 16 is explained, but this invention is not limited to this case. As a fifth embodiment, as shown in FIG. 16, it is possible to connect the object distributor 3 and the sorter 6 by use of a feeding path 61 by taking the processing time in the precise examination processing section 16 into consideration instead of the operation for moving the storage box 4c.

In this case, since the storage box 4c becomes unnecessary and the movement of the to-be-detected objects S in the storage box 4c and the movement of the storage box 4c are unnecessary, the time and labor can be alleviated.

The operation of the device with the above construction is explained.

To-be-detected objects S are sequentially taken out from a supplying section (not shown) and fed on the feeding path 1, the physical characteristics of the to-be-detected objects S are detected by the sensor sections 11 and the detection outputs are supplied to the distributor 12.

At this time, the generalizing section 15 creates index information for each of the to-be-detected objects S sequentially taken out from the supplying section and manages the same while effecting the feeding control.

The distributor 12 supplies the detection outputs from the sensor sections 11, that is, various physical characteristics of the to-be-detected objects S to the detection processing section 13 and data storage unit 14.

The data storage unit 14 attaches the index information of the to-be-detected object S supplied from the generalizing section 15 to the various physical characteristics (including an identifier) of the to-be-detected object S from the sensor sections 11 and stores them.

The detection processing section 13 performs the detection process based on the various physical characteristics of each to-be-detected object S from the sensor sections 11.

As a result, the generalizing section 15 receives the results of the detection processes based on the various physical characteristics for each to-be-detected object S read out from the common memories 13b of the detection processing section 13, synthetically determines the detection result based on the results of the detection processes and outputs an instruction corresponding to the detection result to the object distributor 3 within a certain period of time (on the real-time basis) in which the to-be-detected object S is fed to the object distributor 3. In this case, if the detection result cannot be determined within the above certain period of time, the generalizing section 15 outputs an instruction corresponding to the absence of the detection result to the object distributor 3 within a period of time in which the to-be-detected object S is fed to the object distributor 3.

As a result, the object distributor 3 distributes and stores the to-be-detected objects S in the storage boxes 4a, 4b according to the instruction corresponding to the detection result from the generalizing section 15 and distributes the to-be-detected objects S to the delaying feeding path 61 according to the instruction corresponding to the absence of the detection result from the generalizing section 15.

Further, the generalizing section 15 outputs the index information string of the to-be-detected objects subjected to the precise examination process as the detection result which requires the precise examination process to the precise examination processing section 16.

As a result, the precise examination processing section 16 receives the index information string from the generalizing section 15, reads out data corresponding to each received index information item one by one from the data storage unit 14, performs the detection process of high-degree algorithm, and supplies the detection result together with the index information to the sorter 6.

As a result, the sorter 6 registers the detection result supplied from the precise examination processing section 16 into a memory (not shown) in correspondence to the index information.

When the to-be-detected object S is supplied to the sorter 6 via the feeding path 61, the sorter 6 reads out the detection result of the precise examination processing section 16 with respect to the to-be-detected object S from the above memory based on the index number and selectively stores (distributes) the to-be-detected object S into the storage box 5 via the gates 23 based on the detection result of the to-be-detected object S. Thus, the to-be-detected objects S are stored into the storage boxes 5 corresponding to the categories of the to-be-detected objects S as the detection results from the precise examination processing section 16.

As described above, the to-be-detected object for which determination of detection is difficult to make in the detection process effected on the real-time basis can be subjected to a more precise detection process without lowering the throughput of the whole detection process.

Further, since physical characteristic data from the sensors acquired in the high-speed detection system is used as it is, it is not necessary to input the physical characteristics required for determination of detection in the precise detection process again, and therefore, the cost can be lowered.

The whole detection performance can be enhanced without lowering the throughput of the detection process of the normal detecting device and without requiring a construction for acquiring the physical characteristics form the to-be-detected object again.

Further, since physical characteristic information obtained from a plurality of sensor sections can be used as an input to one process, a detection process of higher performance can be attained.

In addition, since the precise examination process can be performed without inputting physical characteristics of an object again by a person or by use of a detection processor, the time and labor of the person can be alleviated and the processor can be made simple in construction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detecting device comprising:
   first acquiring means for acquiring physical characteristic information obtained from a to-be-detected object;
   storage means for storing the physical characteristic information acquired by said first acquiring means together with specified data which specifies the to-be-detected object;
   first determining means for determining that the to-be-detected object corresponding to the physical characteristic information acquired by said first acquiring means is a specified object based on the physical characteristic information;
   second acquiring means for acquiring corresponding physical characteristic information from said storage means based on the specified data of the to-be-detected object when said first determining means has determined that the to-be-detected object is a specified object; and
   second determining means for making a more precise determination than the determination by said first determining means with respect to the to-be-detected object based on the physical characteristic information acquired by said second acquiring means.

2. The detecting device according to claim 1, wherein said second determining means includes output means for outputting a determination result by said second determining means.

3. The detecting device according to claim 1, wherein said first acquiring means includes means for acquiring, as the physical characteristic information, one of an image pattern of an image on the to-be-detected object, infrared, ultraviolet, visible light information as light information on the to-be-detected object, thickness information of the to-be-detected object, and modified data obtained by dividing the to-be-detected object, taking a difference between the detection results of the adjacent areas detected and storing the difference.

4. The detecting device according to claim 1, wherein said first determining means determines that the detection result of the to-be-detected object corresponding to the physical characteristic information acquired by said first acquiring means is a marked detection result based on the physical characteristic information and includes processing means for calculating a statistic value or converting data into an image based on the physical characteristic information acquired by said first acquiring means and output means for outputting a processing result by said processing means.

5. A detecting method comprising:
   a first step of acquiring physical characteristic information obtained from a to-be-detected object;
   a second step of storing the physical characteristic information acquired by said first step together with specified data which specifies the to-be-detected object;
   a third step of determining that the to-be-detected object corresponding to the physical characteristic information acquired by said first step is a specified object based on the physical characteristic information;
   a fourth step of acquiring corresponding physical characteristic information from said second step based on the specified data of the to-be-detected object when it is determined in said third step that the to-be-detected object is a specified object; and
   a fifth step of making a more precise determination than the determination in said third step with respect to the to-be-detected object based on the physical characteristic information acquired by said fourth step.

6. The detecting method according to claim 5, wherein said fifth step includes a sixth step of outputting a determination result by said fifth step.

7. The detecting method according to claim 5, wherein in said second step, one of an image pattern of an image on the to-be-detected object, infrared, ultraviolet, or visible light information as light information on the to-be-detected object, thickness information of the to-be-detected object, and modified data obtained by dividing the to-be-detected object, taking a difference between the detection results of the adjacent areas detected and storing the difference, is acquired.

8. A to-be-detected object processing device comprising:
   first acquiring means for acquiring physical characteristic information obtained from a to-be-detected object;
   storage means for storing the physical characteristic information acquired by said first acquiring means together with specified data which specifies the to-be-detected object;

first determining means for determining the to-be-detected object corresponding to the physical characteristic information acquired by said first acquiring means based on the physical characteristic information;

storing means for distributing and storing the to-be-detected object corresponding to the determination result by said first determining means into a first storing section based on the determination result and distributing and storing the to-be-detected object for which determination result by said first determining means has not been obtained into a second storing section;

second acquiring means for acquiring corresponding physical characteristic information from said storage means based on information indicating the to-be-detected object for which determination result by said first determining means has not been obtained;

second determining means for making a more precise determination than the determination by said first determining means with respect to the to-be-detected object based on the physical characteristic information acquired by said second acquiring means; and processing means having the second storing section set therein, for sequentially taking out the to-be-detected objects stored in the second storing section and storing the to-be-detected objects into third storing sections of different categories based on the determination result by said second determining means.

9. The to-be-detected object processing device according to claim 8, wherein said storage means includes a storage medium for storing the physical characteristic information acquired by said first acquiring means with respect to the to-be-detected object for which a determination result by said first determining means has not been obtained together with the specified data for specifying the to-be-detected object, said second acquiring means reads out the specified data for specifying the to-be-detected object for which determination result by said first determining means has not been obtained from said storage medium and acquires physical characteristic information corresponding to the specified data, and the processing device is divided into a detecting device including said first acquiring means, first determining means, storing means and storage means and precise examining means including said second acquiring means, second determining means and processing means.

10. A to-be-detected object processing device comprising:

first acquiring means for acquiring physical characteristic information obtained from a to-be-detected object;

storage means for storing the physical characteristic information acquired by said first acquiring means together with specified data which specifies the to-be-detected object;

first determining means for determining the to-be-detected object corresponding to the physical characteristic information acquired by said first acquiring means based on the physical characteristic information;

distributing means for distributing the to-be-detected object corresponding to the determination result by said first determining means into a first storing section, and the to-be-detected object for which a determination result has not been obtained into a delaying feeding path based on the determination result;

second acquiring means for acquiring corresponding physical characteristic information from said storage means based on information indicating the to-be-detected object for which determination result by said first determining means has not been obtained;

second determining means for making a more precise determination than the determination by said first determining means with respect to the to-be-detected object based on the physical characteristic information acquired by said second acquiring means; and processing means for storing the to-be-detected object fed by the delaying feeding path into one of a plurality of second storing sections of different categories based on the determination result by said second determining means.

* * * * *